Sept. 30, 1952 W. A. HUNSUCKER 2,612,025
PREFABRICATED MARINE STRUCTURE
Filed July 7, 1949 4 Sheets-Sheet 1

INVENTOR.
WILLIAM A. HUNSUCKER
BY HIS ATTORNEYS.
HARRIS, KIECH, FOSTER & HARRIS
BY

Sept. 30, 1952 W. A. HUNSUCKER 2,612,025
PREFABRICATED MARINE STRUCTURE
Filed July 7, 1949 4 Sheets-Sheet 2
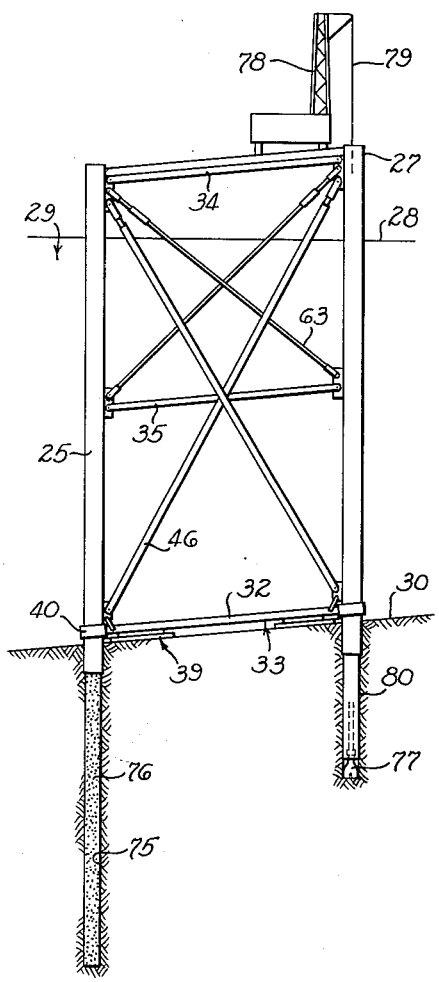
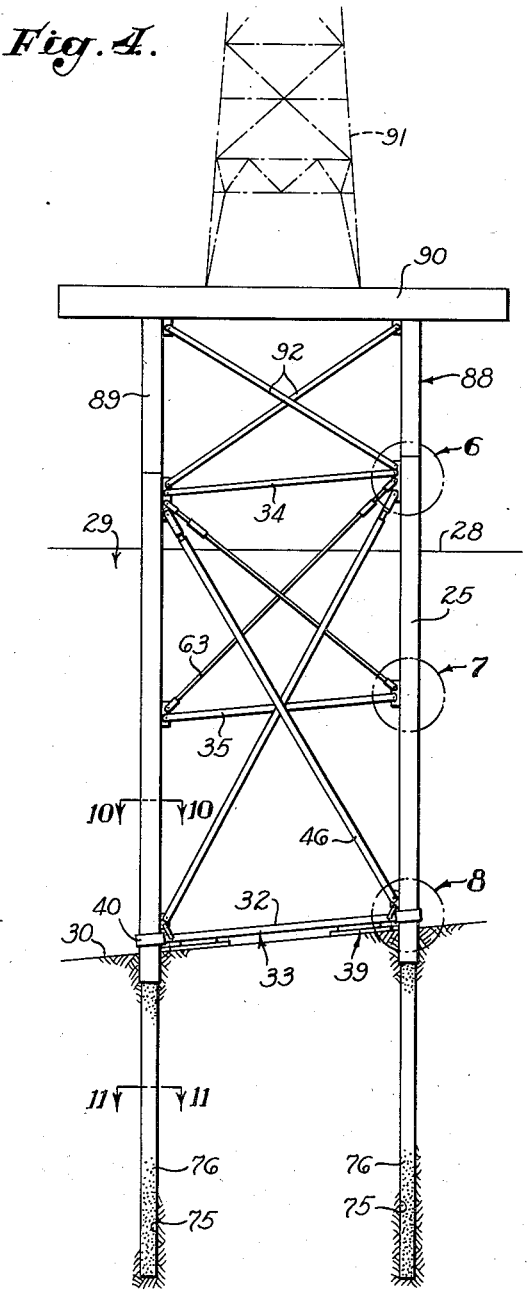
INVENTOR.
WILLIAM A. HUNSUCKER
BY HIS ATTORNEYS.
HARRIS, KIECH, FOSTER & HARRIS
BY
Clarence F. Kiech

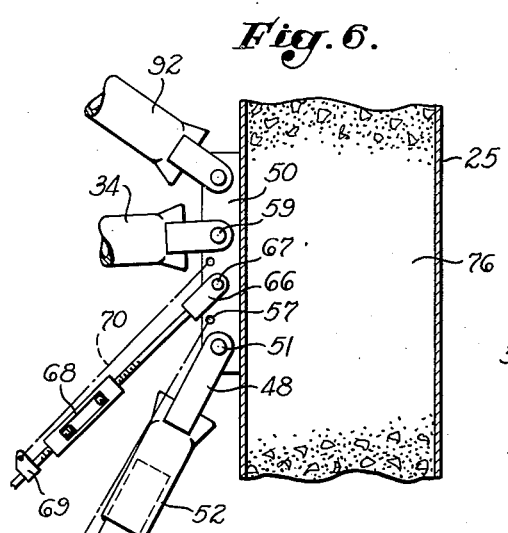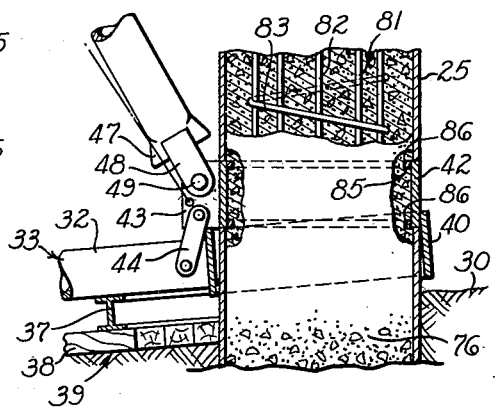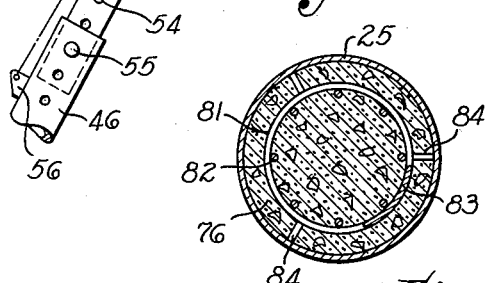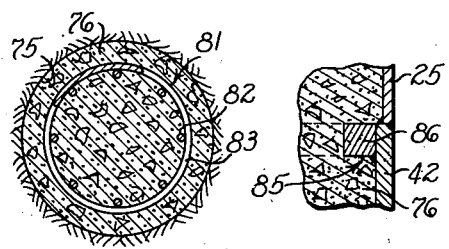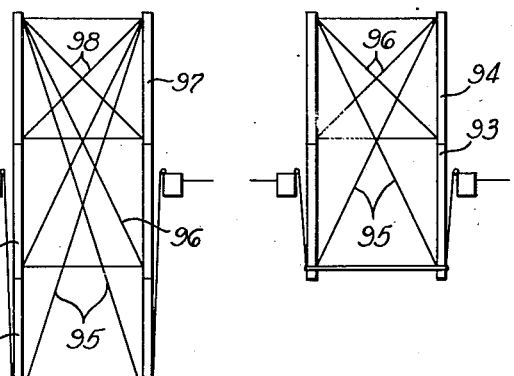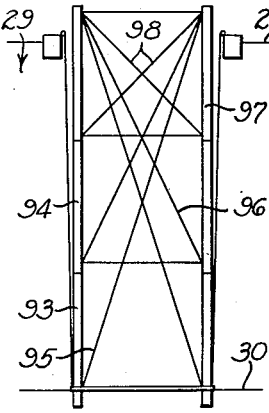

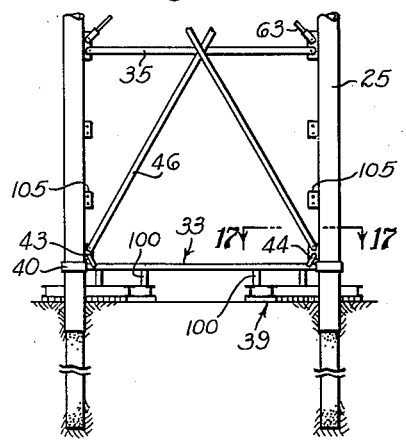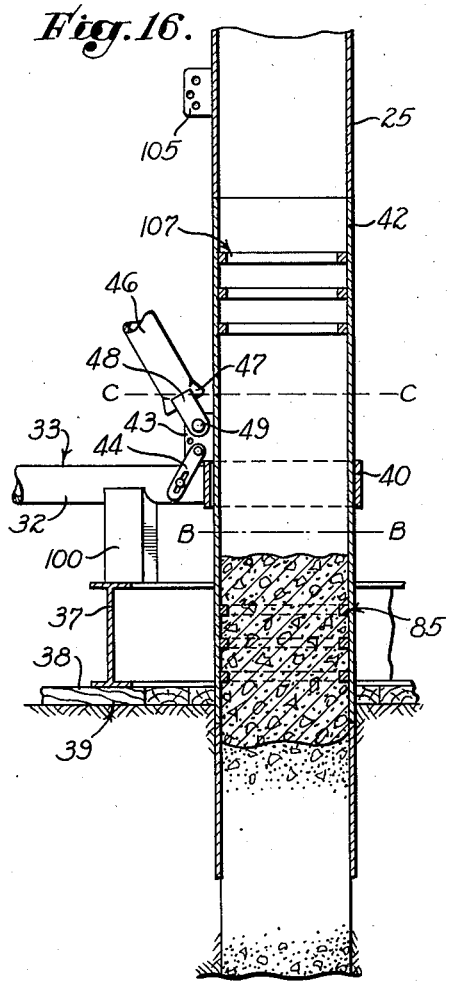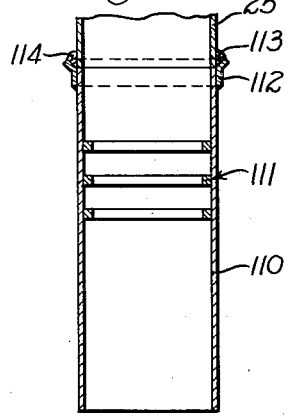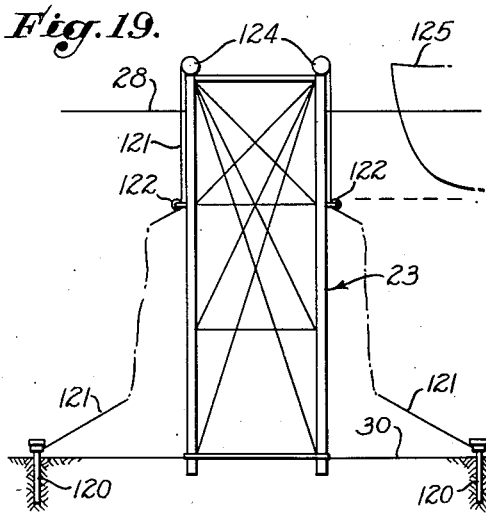

Patented Sept. 30, 1952

2,612,025

UNITED STATES PATENT OFFICE 2,612,025

PREFABRICATED MARINE STRUCTURE

William A. Hunsucker, Los Angeles, Calif.

Application July 7, 1949, Serial No. 103,341

24 Claims. (Cl. 61—46)

My invention relates to submarine structures and more particularly to a submarine foundation structure for supporting off-shore drilling equipment.

Present marine structures of this type are extremely massive and require in their fabrication or placement the help of divers or very heavy equipment. Additionally, when most of such structures are in place they are subject to extremely high forces resulting from currents and wave motion.

It is an object of the present invention to provide a lightweight prefabricated or partially prefabricated marine structure that can be readily transported and placed at the desired site by the use of light transport facilities and equipment.

Another object of the invention is to transport, lower and adjust a marine structure which can be converted to a heavy duty durable structure adequately anchored to the earth beneath the body of water.

When a prefabricated structure is lowered to rest on the surface of the earth beneath a body of water, its weight or any slope of the earth's surface on which it rests will often cause such tipping of the structure that its central axis is not vertical. In my prior application Serial No. 66,026 entitled Submarine Foundation and Method of Erecting, I have disclosed a way of meeting this problem by constructing the marine structure at the site. The present invention meets this problem in quite another way, namely, by the lowering of a deformable but temporarily rigidified structure through the water and to the surface of the earth, the structure being reoriented in shape to bring its central axis into a vertical position. It is an important object of the present invention to provide a structure which can be reoriented in shape after it is lowered to rest on the surface of the earth beneath a body of water.

Another object of the invention is to provide a multi-sided marine structure each side of which is a quadrilateral of a shape depending upon the relative lengths of its diagonals, together with diagonal bracing means which can be adjusted to change the shape of the side, thus permitting reshaping of the entire structure by adjusting the diagonal bracing members of at least two of the sides.

A further object of the invention is to provide a simplified diagonal bracing which can be adjusted from a position adjacent the surface of the body of water.

A further object is to provide such a structure having tubular column members which give access to the earth from a position adjacent the surface of the body of water.

A further object is to anchor such a structure by drilling into the earth below one or more of such tubular column members, the resulting shaft being filled with a cementitious material to act as an anchor for the structure.

A further object is to provide a structure which can be used for off-shore drilling yet which can be reused at another site in the event the first drilling operation is commercially unproductive.

A further object is to provide a novel bracing arrangement for a submarine structure.

Certain general objects of the invention are to provide a marine structure which can be initially installed without requiring the services of a diver; to provide a structure which offers minimum impedance to currents and wave motion; to provide a structure which can be installed without the use of pile driving equipment; and to provide a structure which is economical in first cost and in maintenance.

Other objects and advantages will be apparent to those skilled in the art from the following description of exemplary embodiments.

Referring to the drawings:

Fig. 3 is a similar view after the shape of the structure has been reoriented, this view also illustrating the anchoring operation;

Fig. 4 is a view showing the completed marine structure;

Figure 7:
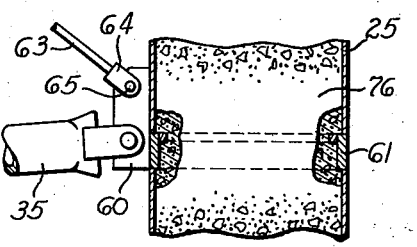

Figs. 6, 7 and 8 are detailed sectional views of the structure in the encircled areas 6, 7 and 8 of Fig. 4;

Fig. 9 is a further enlarged view of a portion of the structure shown in Fig. 8;

Figs. 10 and 11 are horizontal sectional views taken along the respectively indicated lines of Fig. 4;

Figs. 12, 13 and 14 are diagrammatic sequence views showing the installation of an alternative form of the invention;

Fig. 15 is a fragmentary view of the lower portion of a further embodiment of the invention;

Fig. 16 is a vertical sectional view of the lower portion of one corner of the structure shown in Fig. 15;

Fig. 17 is a horizontal sectional view taken along the line 17—17 of Fig. 15;

Fig. 18 is a view illustrating how the structure of Figs. 15–17 can be moved and reused at another location; and Fig. 19 is a diagrammatic view illustrating a manner of temporarily bracing any of the structures of the invention.

Figure 1:
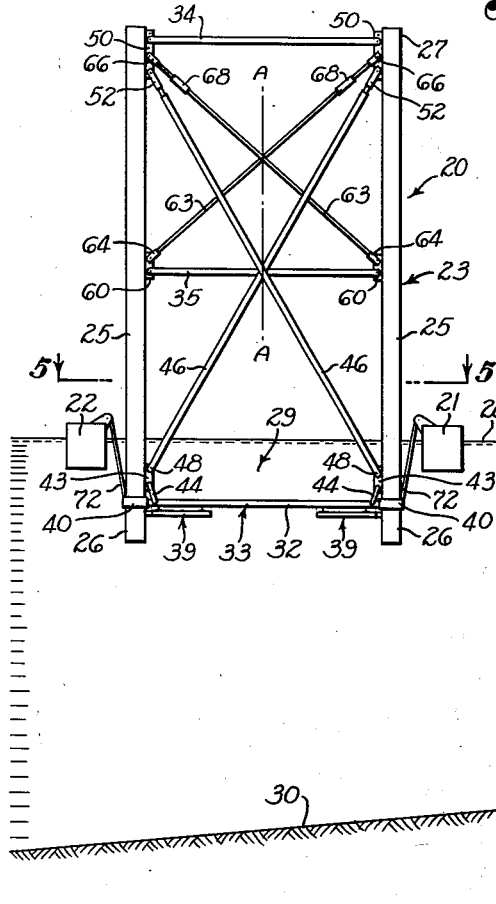
Fig. 1 illustrates one embodiment of the invention as it is being floated to the desired site.

Referring particularly to Fig. 1, there is shown one embodiment of the marine structure, indicated by the numeral 20, being transported to a drilling site while supported on pontoons 21 and 22. In Fig. 1, the structure is shown in an initial shape, subject to later reorientation.

In general, this embodiment of the invention includes a prefabricated multi-sided hollow framework 23, one side or side structure being shown in Fig. 1. Each side of the framework 23 is preferably a deformable quadrilateral having a shape determined by the relative lengths of its diagonals. In Fig. 1, the structure is illustrated as having rectangular sides but trapezoidal or other quadrilateral configurations can be employed without departing from the spirit of the invention.

The framework of Figs. 1–11 includes a plurality of tubular column members 25 of sufficient length to extend throughout the depth of the water at the desired site so as to provide a lower earth-engaging or earth-penetrating portion 26 and an upper portion 27 which will lie adjacent and preferably above the surface 28 of a body of water 29 when the lower portion or earth-penetrating portion 26 is in contact with the surface of the earth 30 below the body of water. Four such tubular column members 25 are used in the embodiment currently described to form the four corners of the framework 23.

Each side of the framework 23 includes a plurality of the transverse members which loosely connect the column members of this side. Generally speaking, at least two such transverse members are employed, the lowermost being a base member 32 of a base structure 33, the uppermost transverse member being a strut 34. On structures to be used at depths of more than about 100 ft., an intermediate strut 35 may be employed. All of the transverse members, whether the base member 32 or the struts 34 and 35, are hinged to the tubular column members 25 of the corresponding side to form a deformable quadrilateral of a shape determined by the relative lengths of its diagonals.

Figure 5:
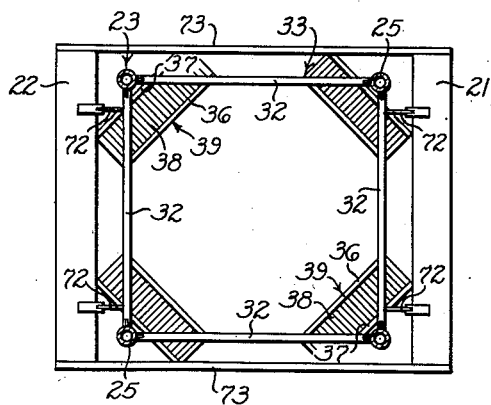
Fig. 5 is a horizontal sectional view taken along the line 5—5 of Fig. 1.

As best shown in Figs. 1 and 5, the base structure 33 may be a rigid structure and is adapted to rest on the surface of the earth 30 and carry the weight of the initial structure. This base structure includes four of the base members 32, one for each side. Bridging diagonally between each pair of base members 32 are beams 36 and 37 which carry bearing members 38 to form a large-area foot structure 39 at each corner of the framework. These foot structures are preferably of sufficient area to carry the weight of the initial structure when initially lowered into contact with the surface of the earth 30. They can be made more or less extensive than as suggested in Fig. 5 without departing from the spirit of the invention.

As best shown in Figs. 1, 5 and 8, the base structure 33 is hinged for limited movement relative to each of the tubular column members 25. This is preferably accomplished by securing the adjacent base members 32 to a collar member 40 of sufficient size to surround loosely the corresponding tubular column member 25 to permit limited angular motion therebetween. The base structure 33 thus acts as a template, maintaining the tubular column members 25 uniformly spaced during lowering of the structure.

The hinged joint between each tubular column member and the base structure 32 is preferably at a position above the lowermost end of the column member, to leave the earth-penetrating portion 26 extending below the base structure. This is preferably accomplished in the manner suggested in Figs. 8 and 9 which illustrate each tubular column member as including an attachment section 42 welded in place between upper and lower portions of the tubular column member to form a part thereof. The attachment section 42 is shown as a collar-like length of any noncorrosive metal, typically stainless steel, which is welded to upper and lower sections of the tubular column member 25 and which sections can be made of ordinary steel, if desired.

Each attachment section 42 provides a massive ear 43 for each adjacent side of the framework, which can transmit a portion of the weight of the structure to the base structure 33. In the arrangement shown, each attachment section will thus have two ears 43 spaced 90° from each other. The base structure 33 is preferably loosely connected to these ears as by links 44 best shown in Figs. 1 and 8. These links prevent dropping of the base structure 33 from the tubular column members 25 yet do not impede the desired hinging action between the base structure and these tubular column members.

The invention comprehends the employment of a diagonal bracing means for each side, comprising crossing diagonal bracing members 46 extending substantially along the diagonals of each side. These diagonal bracing members may be steel cables containing the turnbuckles or other adjusting means to be described, such cables acting exclusively as tension braces. However, in Figs. 1–8, I have shown the diagonal bracing members 46 as comprising lengths of pipe to take both tension and compression loads. Each pipe at its extreme upper and lower ends is flattened and welded to provide an end portion 47 (Fig. 8), thus sealing the interior of the pipe from the surrounding water so that the air within the pipe acts as a buoyant medium for the structure to decrease somewhat the weight of the structure upon submergence. Welded to each end portion 47 is a pair of members 48 spaced to receive the ear 43 and pivotally connected thereto by a removable pin 49. Correspondingly, each diagonal bracing member 46 is hinged at its lower end to one of the tubular column members 25.

At its upper end, each diagonal bracing member 46 is similarly formed, see Fig. 6, the members 48 being spaced to receive an ear 50 welded to the upper exterior of the tubular column member to which the diagonal bracing member is to be connected. Again, a hinged connection is provided, as by a removable pin 51.

Each diagonal bracing member 46 thus extends from a lower corner of the framework to an upper diagonal corner and any suitable adjusting means is provided for adjusting its length to adjust the shape of the quadrilateral side. As shown in Fig. 6, the adjusting means is of the pin type, the diagonal bracing member 46 having an upper section 52 to which a shaft 53 is connected, this shaft sliding in the main portion of the diagonal bracing member and providing holes 54 any one of which can be traversed by a pin 55, carried by the main diagonal bracing member, to adjust the overall length of the latter. To aid in this adjustment, the main portion of the diagonal bracing member 46 carries an ear 56 having a hole for receiving a hook of a conventional block and tackle. The other hook thereof may be received by a hole 57 of the ear 50 so that the block and tackle will pull in the direction of the dotted line shown. Actuation of the block and tackle will thus permit change in length of the diagonal bracing member when the pin 55 is removed. In the preferred practice, the holes 54 may be differentially spaced relative to corresponding holes in the main portion of the diagonal bracing member 46 so that a relatively small adjustment in length can be effected by changing the position of the pin 55 and placing it in then-aligned holes.

The upper struts 34 may also be formed of pipe with flattened ends connected and hinged to the ear 30 as by removable pins 59, see Fig. 6. The same is true as to the intermediate struts 35, if used, the connection here being shown in Fig. 7 as to an ear 60 welded to an attachment section 61 similar in function to the attachment section 42 previously described.

If the intermediate struts 35 are used, each strut will form the lower part of a quadrilateral upper section of the side traversed by intersecting diagonal bracing members 63 extending to a position adjacent and preferably above the surface of the water 28. The diagonal bracing members 63 are shown as rods or steel cables having a clevis 64 at the lower end and connected to the ear 60 by a pin 65, see Fig. 7. At the upper end, each diagonal bracing member 63 includes a clevis 66 connected by a pin 67 to the corresponding ear 50. Near the upper end of each diagonal bracing member 63 is disposed a turnbuckle 68 or other means for adjusting the length of the bracing member. As before, the diagonal bracing member may carry an ear 69 connectable by a block and tackle, suggested by the dotted line 70, to the ear 50, the block and tackle paralleling the turnbuckle and aiding in the desired adjustment of length of the diagonal bracing member 63.

It will thus be apparent that the framework 23 is composed of side structures which can be changed in shape by adjustment of the diagonal bracing members. The entire framework 23 is in effect a flexible, articulated structure of a shape determined by the lengths of the diagonal bracing members.

In the preferred practice of the invention, the framework 23 is initially rigidified by the diagonal bracing members so that the central axis A—A of the framework is substantially perpendicular to the base structure 33. In this initially adjusted position, the framework is floated to the desired site as by being hung on cables 72 extending around any suitable hoist mechanism carried by the pontoons 21, these pontoons being spaced from opposite sides of the framework by spacing members 73. Alternatively, pontoons may be placed on all four sides of the framework or the framework may be transported to the site on a suitable barge and lowered by a crane. If the pontoon arrangement suggested in Figs. 1 and 5 is used, it will be apparent that the structure can be progressively lowered as the depth of the water increases, thus increasing the stability of the floating structure by lowering the center of gravity.

When the framework is above the desired zone of the surface of the earth 30, it is lowered by uniform feeding of the cables 72. When the base structure 33 reaches the surface of the earth 30, the earth-penetrating portions 26 will sink at least partially into the surface. It is desirable at this stage that the earth be penetrated sufficiently to stabilize the structure against horizontal displacement from the desired zone and that the penetration be sufficient to bring the foot structures 39 into bearing engagement with the surface of the earth 30. The weight of the framework will usually be sufficient in this latter regard but if not, a small pile driver may be used to deliver percussive blows to the upper ends of the tubular column members 25.

Figure 2:
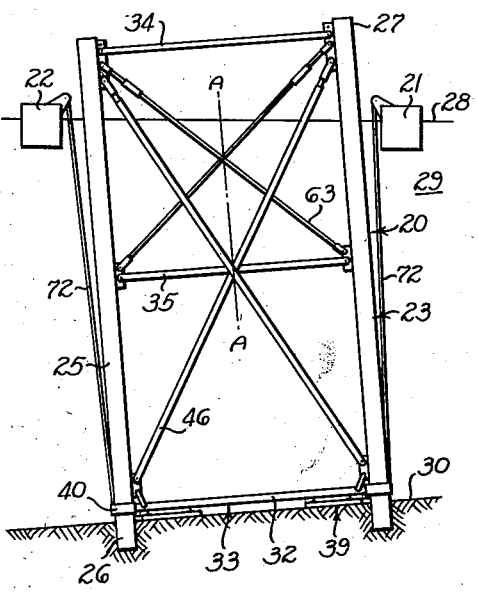
Fig. 2 shows the structure of Fig. 1 when initially lowered to rest on a sloping zone of the earth's surface.

If the surface of the earth 30 slopes or if one corner of the structure penetrates the surface to a degree greater than the other corners, the initially adjusted structure will have its central axis A—A inclined from the vertical, as suggested in Fig. 2. In practically no instance is it ever feasible to select a zone of the earth's surface which is absolutely level and of uniform hardness. For this reason, the initially adjusted structure will almost invariably be inclined, although the inclination in Fig. 2 has been exaggerated for purpose of clarity.

The next step in the installation is to adjust the relative lengths of the diagonal bracing members 46 (and of the diagonal bracing members 63, if used), to bring the central axis of the framework into a vertical position. This is relatively easily accomplished as the adjusting means are above or accessible from the surface 28 of the body of water 29. Opposite sides of the structure will then be in the shape of a parallelogram, in the embodiment under discussion, see Fig. 3. When the structure is in this position, diagonal braces may be applied, as later described with reference to Fig. 19, merely to hold the structure against tipping by contact with boats or by storms. Usually, however, no such diagonal bracing means need be employed as the structure will be sufficiently stable at this time even if it is only of relatively light weight.

To anchor the structure to the earth when in its adjusted position, suggested in Fig. 3, a suitable shaft 75 is drilled in the zone below each tubular column and later filled with a cementitious material to form a cementitious column 76 extending throughout at least a portion of the corresponding tubular column member 25. The drilling of such a shaft can be effected by lowering a rotary or percussive drilling tool 77 through the tubular column member, the tool 77 being actuated by any suitable mechanism. In Fig. 3, percussive type drilling is suggested, using a lightweight rig 78 with a cable 79 depending to the tool 77. If the shaft has a tendency to cave in during drilling, an inner pipe 80 may be lowered as drilling progresses.

After each shaft 75 has been drilled, a suitable reinforcing structure 81 (Fig. 8) is lowered into the shaft. This reinforcing structure 81 should extend upwardly in the tubular column member 25 at least to a position slightly above the attachment section 42. The reinforcing structure is preferably constructed as disclosed in my copending application, supra, and includes longitudinal members 82 welded to a helical member 83 to form a hollow reinforcing structure centralized in the shaft and tubular columns by any suitable spacing members 84, suggested in Fig. 10 and preferably formed as in my application supra.

The cementitious material, typically concrete, is then placed in the shaft to be cast with surface irregularities corresponding to the irregularities of the shaft as drilled, thus providing a very effective anchor. The cementitious material may be placed in each shaft by means of a tremie pipe or bottom dump bucket. If the shaft has a tendency to collapse unless supported by the inner pipe 80, the cementitious material may be inserted while raising the inner pipe 80 so that its rising lower end expels the cementitious material or is immediately above the position of expulsion thereof.

In the embodiment of the invention shown in Figs. 1–11, the cementitious material fills the tubular column member 25 substantially completely. This is often advantageous as the resulting cementitious column 76 will then be available to take the entire load of any drilling equipment later installed, even though the tubular column member itself is not protected so as to be gradually corroded away.

However, it is most desirable that the loads from the diagonal bracing members be transferred directly to the cementitious columns, particularly at all positions where the tubular column member might tend to rust or corrode. For this purpose, the invention provides an interengaging means 85 between each tubular column member and its cementitious column for transmitting to the latter any force components parallel to the former and arising from the diagonal bracing or from the weight of the framework or superimposed loads. This interengaging means 85 should preferably comprise a bearing surface fixed to the tubular column member and a bearing surface fixed to the cementitious column. The former bearing surface is provided by a pair of flanges 86 welded to the interior of the attachment section 42 (see Figs. 8 and 9) while the latter bearing surface is provided by the contacting surfaces of the cementitious column 76. Various other forms of interengaging means may be employed so long as one bearing surface of the cementitious column engages another bearing surface of the tubular column member 25. Under conditions of heavy wave or wind action, the structure is subjected to appreciable horizontal forces. In addition, horizontal forces are developed by wave motion or currents in the water, although the latter are minimized by the open-sided framework suggested. All such horizontal forces produce appreciable stresses in the diagonal bracing members, with components tending to produce movement of the tubular column members relative to their cementitious columns. This motion is prevented by the interengaging means. By placing the interengaging means directly opposite the ears 43 or 60, the forces from the diagonal bracing members will be transmitted directly to the cementitious columns through the noncorrosive attachment sections 42 and 61, thus insuring that the cementitious columns will carry the loads even though the tubular column members rust away.

After the structure has been anchored at each of its corners, a superstructure 88 may be built on top of the framework. This superstructure includes a plurality of legs 89 which may be of differential length to compensate for any distorted pattern of the upper ends of the tubular column members 25. The legs 89 may be welded directly to the upper ends of the tubular column members 25 and will support a platform 90 in level position and on which a derrick 91 may be constructed, all as shown best in Fig. 4. Diagonal bracing members 92 may be employed for the superstructure 88, as suggested in Figs. 4 and 6.

In the embodiment thus far described, the framework can be transported horizontally, if desired, one end being released at the site to swing the base structure downwardly while the top of the framework is supported by a barge or pontoons. In other instances, and where extreme depths are encountered, the arrangement of Figs. 12–14 can be used. Here, the initial prefabricated construction includes first and second frameworks 93 and 94 welded together, the former having a base structure as previously described. These two frameworks are braced by diagonal bracing members 95 extending from the lowermost corner of the first framework 93 to the diagonally opposite uppermost corner of the second framework 94. Similarly, the uppermost framework 94 is braced by diagonal bracing members 96.

These two frameworks are lowered into the water to a position suggested in Fig. 13 and a third framework 97 is placed or built on top thereof, with its tubular column members welded to the tubular column members of the second framework 94. At this time, the diagonal bracing members 95 are removed from the upper corner of the second framework 94 and attached to the corresponding upper corner of the third framework 97. The same is done with the diagonal bracing members 96 and additional diagonal bracing members 98 are installed on the third framework 97. The third-unit framework may then be lowered into contact with the surface of the earth 30 below the body of water 29. Any number of additional frameworks may be attached progressively to accommodate greater depths.

When the composite framework of Fig. 14 rests on the earth's surface, the diagonal bracing members are respectively adjusted to bring the central axis of the composite framework into vertical position, whereupon the shafts below the tubular columns may be drilled, as previously described, and the cementitious anchoring columns cast in place.

In the event that it is desirable to be able to move the framework to another location, the arrangement in Figs. 15–18 may be employed. Here, the structure is substantially the same as the embodiment of Figs. 1–11, with the following exceptions:

As suggested in Fig. 17, the beams 37 may be extended beyond the corners of the structure to increase in area the bearing means 38, an arrangement that can also be employed in the previously-described embodiments. Additionally, the beams 36 and 37 are not in direct engagement with the base member 32 but are spaced therefrom by posts 100 (Figs. 15 and 16). The base members 32 are linked to the ears 43 in the same manner as previously described, except that the links 44 provide elongated slots permitting a greater degree of longitudinal movement of the collar members 40 along the tubular column members 25.

The cementitious column, in the embodiment of Fig. 16, is built up no higher than adjacent the zone occupied by the posts 100. Correspondingly, if the framework is to be released, a diver can cut through the tubular column member 25 in the zone B—B, just above the cementitious column, using a cutting torch, the structure being at least partially supported by pontoons or a crane before the cutting is started. After all four tubular column members have been severed, the structure may be raised slightly in the water, the base structure and the various foot structures 39 rising therewith. The diver may then weld a new earth-penetrating portion on the bottom of the severed tubular column member as later described with reference to Fig. 18. Welding in submerged position is feasible but somewhat difficult and if this operation is to be avoided, the alternative described in the following paragraph can be used.

If submarine welding is to be avoided, another pair or several other pairs of ears 105 can be initially present on each tubular column member 25 at an upper position. The diagonal bracing members 46 can be released and reconnected, one at a time, to the corresponding upper ears 105 merely by removing the pins 49 and similarly pin-connecting the diagonal bracing members to the appropriate upper ears. The base structure 33 can be suitably connected to the upper ears 105 and the entire structure lifted after cutting of the columns along the line B—B. After transportation to a new site, the structure may be lowered, a diver reconnecting the ears 105 to the base structure 33 by conventional links 44 after the tubular column members are lowered in the collars 40, the lower ends of the tubular column members then forming new earth-penetrating portions. It is desirable to provide another interengaging means 107 to be available when the new cementitious column is cast in place. With this arrangement, the interengaging means 85 is preferably placed a distance below the collar member 40 in the initial installation and it is usually desirable to use a more extensive attachment section 42, extending from one interengaging means to the other.

In the event that a new earth-penetrating portion is to be welded to each column at a subterranean position, as previously described, such welding will be facilitated if a structure as suggested in Fig. 18 is employed. Here the new earth-penetrating portion or section is indicated by the numeral 110 and includes flanges 111 forming a part of an interengaging means. At the upper end of the new earth-penetrating portion 110 is welded an upwardly flaring collar 112 which provides a tapered annular space 113. This space aids alignment with the severed lower end of the tubular collar member 25 and surrounds the lower end thereof to aid and guide the welding operation which includes a partial filling of the space 113 with welding material 114. The flaring collar 112 substantially simplifies the subterranean welding operation.

A preferred practice which avoids welding at a submarine location, yet which permits disconnection of the structure from the earth for movement to another location, is as follows: In a structure such as shown in Fig. 16, the diagonal biasing members 46 may be disconnected one at a time by removal of the pins 49 and reattached to an appropriate upper ear 105. The ears 43 from which the diagonal biasing member has been disconnected may then be cut off with a torch, preferably after disconnecting the links 44. Cables can then be lowered from the surface of the water and attached to the base structure 33 to lift same along the tubular column members until the collar members 40 engage the ears 105, the base structure being then secured thereto by reconnection of the links 44. The structure is then at least partially supported by pontoons or by a crane or a barge, preferably sufficient upward pull being exerted to place the tubular column members under a slight tension. Each tubular column member can then be cut in a zone C—C to release the structure and permit its transportation to a new site. The structure is then available for relocation in somewhat shallower water, the portions of the tubular column members 25 below the ears 105 comprising new earth-penetrating portions.

The structure may also be relocated at a deeper site if the existing platform is still sufficiently above the surface of the water. If not, an additional framework or unit structure, similar to that indicated in Fig. 13 by the numeral 97, may be interposed between the uppermost strut and the superstructure 88 or the platform 90, this being done while the framework is supported with its upper end above water to permit interposing the supplementary unit without submarine welding. The new composite structure can then be lowered, reshaped and reanchored at a deeper site, in the manner previously described.

In marine structures adapted for installation at considerable depths, e. g., several hundred feet, it is sometimes desirable to provide temporary diagonal bracing means for the structure before anchoring by means of the cementitious columns, as previously suggested. The preferred arrangement is shown in Fig. 19 and includes one or more anchor means 120 penetrating the surface of the earth 30 a substantial distance from the framework 23, shown as constructed in accordance with Figs. 12–14 for exemplary purposes. The anchoring means 120 may be any type of marine anchor but preferably represents a column-like member driven into the earth by a pile driver, the percussive blows being transmitted through a member reaching to the surface 28 of the body of water. Alternatively, a long pipe can provide a lower portion which is driven into the earth, the upper portion being subsequently unscrewed, or such pipe can be driven by jetting a stream of water from the lower end, with or without the aid of percussive blows, an upper section of the pipe being then unscrewed to leave the anchoring means 120 in place. In any event, it is desirable to set the anchor means 120 while the lower end of a guy member or bracing cable 121 is connected thereto. This cable is shown broken in Fig. 19 in view of space limitations, but extends upwardly and inside of a pulley means 122 attached to one side or one corner of the framework 23 at a position a substantial distance below the surface 28 of the body of water. The cable 121 then extends upwardly along the framework to the upper portion thereof where it is secured by any adjusting or clamping means 124 which may often consist of a suitable winch. This cable arrangement is particularly desirable in permitting the close approach of boats or barges, suggested at 125, without danger of contact with any of the cables 121, which contact by a boat or barge might sever one of the cables or cause breakage of other cables with consequent tipping of the framework. Additionally, if the cables 121 are attached before the framework is seated on the earth's surface and while it is still supported by pontoons or other buoyant means, adjustment of the relative lengths of the cables 121 will permit the guiding, shifting or translating of the framework preparatory to being lowered onto the earth's surface.

While exemplary embodiments of the invention have been specifically described, it should be understood that the invention is not limited thereto. These embodiments will suggest to those skilled in the art various changes and modifications which can be made without departing from the spirit of the invention.

I claim as my invention:

1. In a prefabricated submarine structure adapted to be lowered to rest on the earth's surface beneath a body of water and which surface may slope or vary in hardness in the zone in which said foundation structure is to be placed, said foundation structure including: a multi-sided framework composed of a plurality of side structures meeting at corners of the framework, each side structure being a quadrilateral formed by a base member, a pair of column members extending in an upward direction from said base member and a strut member, each side structure including means for pivotally connecting the ends of said base member respectively to said column members at a lower level and for pivotally connecting the ends of said strut member respectively to said column members at an upper level to form a deformable quadrilateral of a shape determined by the relative lengths of its diagonals, said quadrilateral tending to deform upon change of slope of said base member when lowered to bear against the earth in said zone due to such slope or variation in hardness of that portion of said zone on which said base member bears; a pair of diagonal bracing members extending substantially along the diagonals of each quadrilateral side structure and tending to resist said deformation thereof; and means for adjusting the relative lengths of said diagonal bracing members of each quadrilateral side to adjust said framework until its central axis is vertical and to rigidify said framework in such adjusted position, said column members providing earth-penetrating portions extending downwardly beneath said base member to stabilize the lower end of said framework against lateral shifting, said portions penetrating the earth during lowering of said framework and before said base member engages the earth in said zone.

2. In a submarine foundation structure adapted to rest on the earth beneath a body of water, a poly- and open-sided framework presenting minimum impedance to currents and wave motion to minimize sideward forces on the structure, said framework providing a central axis and including, in combination: a base structure providing a bearing surface adapted to bear against the surface of the earth; a plurality of column members corresponding in number to the number of sides of said framework and each of a length sufficient to extend from said base structure substantially to the surface of said body of water; means for hinging each column member to said base structure for limited angular movement therebetween, said hinging means being disposed intermediate the ends of each column member whereby each column member provides an earth-penetrating portion below its hinging means and below said base structure; struts hinged to the upper ends of adjacent column members, each strut and the two column members to which it is hinged cooperating with a portion of said base structure in forming a side of said framework, each side being a quadrilateral of a shape determined by the relative lengths of its diagonals; a pair of diagonal bracing members extending between opposite corners of each side of said framework, said bracing members initially rigidifying said framework and retaining its central axis substantially perpendicular to the plane of said base member, said central axis tipping from the vertical if said surface of the earth supports said base member in a nonlevel position; and means for adjusting the relative lengths of said diagonal bracing members in at least some of the sides of said framework while said base member bears against said surface of the earth to bring said central axis of said framework into a substantially vertical position.

3. In a submarine structure adapted to rest on the earth's surface beneath a body of water, said foundation structure comprising a multi-cornered hollow framework, said foundation structure including: a plurality of column members comprising the corners of said framework, each column member providing a lower portion and an upper portion providing a plurality of openings through which said lower portions of said column members extend loosely to permit limited hinging of each column member relative to said base structure; a base structure; means for loosely connecting said base structure to said lower portions of said column members to be supported thereby as said column members are lowered in the water, said base structure being adapted to rest on the surface of the earth beneath said body of water as a support for said framework; a plurality of struts; means for connecting each of said struts to extend between the upper portions of adjacent column members, each strut and its connected column members cooperating with a portion of said base structure in forming a quadrilateral comprising a side of said framework; and means for adjustably diagonally bracing each of said sides of said framework.

4. In a submarine structure adapted to rest on the earth's surface beneath a body of water and which surface may slope or vary in hardness in the zone in which said foundation structure is to rest, said foundation structure including: a multi-cornered hollow framework having a central axis and providing a plurality of column members and a plurality of transverse members extending between and hinged to each pair of column members at a plurality of different levels to form open sides of said framework offering little resistance to currents and wave motion, each side of said framework being formed by said column members and the transverse members of that side into at least two superimposed quadrilaterals determined in shape by the relative lengths of the diagonals of each quadrilateral; a plurality of bracing members for each side, each bracing member being connected to and extending from a lower corner of the lowermost quadrilateral across a quadrilateral thereabove to a diagonally opposite position adjacent the upper diagonally opposite corner of the uppermost quadrilateral; a plurality of bracing members for the uppermost quadrilateral and extending diagonally from a lower corner thereof to said diagonally opposite position whereby the upper ends of bracing members from the lower corners of the lowermost and uppermost quadrilaterals terminate adjacent said diagonally opposite position adjacent the upper corner of each uppermost quadrilateral; and means for securing such upper ends of such bracing members at said position to the adjacent column member and for adjusting the lengths of such bracing members to rigidify said framework with its central axis substantially vertical.

5. A submarine foundation structure as defined in claim 4, in which said column members are of a length to extend above the surface of said body of water and in which said securing and adjusting means are disposed above said surface of said body of water.

6. In a submarine structure adapted to rest on the earth's surface beneath a body of water and which surface may slope or vary in hardness in the zone in which said foundation structure is to rest, said foundation structure including: a plurality of column members providing the corners of a multi-sided framework; upper and lower transverse members extending between and hinged to each pair of column members at upper and lower positions respectively adjacent such surface of the earth and adjacent the surface of said body of water, said lower transverse member of each side of said framework being a base member adapted to bear against said surface of the earth to assume a position determined thereby, said upper transverse member of each side assuming a corresponding position when the central axis of said framework is vertical; a pair of diagonal bracing members for each side of said framework for rigidifying said framework in such position with its central axis substantially vertical, the slope of the top transverse members and the levels of the tops of said column members being then related to the slopes of the base members; and a superstructure above said framework and secured thereto, said superstructure comprising a platform and a plurality of legs corresponding in number to and spaced to rest on said column members, said legs being of different length relative to each other to level said platform, said legs being respectively secured to said column members.

7. In a submarine structure adapted to rest on the earth's surface beneath a body of water, said structure comprising a multi-cornered hollow framework, said structure including in combination: a plurality of tubular column members comprising the corners of said framework, each column member providing open-ended upper and lower portions; a base structure joining and spacing said lower portions of said tubular column members, said base structure being adapted to rest on the surface of the earth beneath said body of water as a temporary support for said framework; means for spacing and diagonally bracing said tubular column members to form relatively open and rigid quadrilateral sides of said framework offering no more than a small impedance to currents and wave motion, said open-ended lower portions of said tubular column members being in engagement with the earth, each of said tubular column members providing an open-ended interior space through which a drilling means can be lowered to drill a shaft into the earth immediately below such tubular column member; a cementitious column filling each of said shafts and at least a part of the lower portion of the adjacent tubular column member, said cementitious columns corresponding in shape to any surface irregularities of the corresponding shafts to form a permanent anchor for said framework below each of said tubular column members; and interengaging means between each tubular column member and its contained cementitious column for transmitting to the latter any force components parallel to the former and arising from said bracing means and from the weight of said framework and superimposed loads, said interengaging means comprising a bearing surface fixed to said tubular column member and positioned interiorly thereof and a bearing surface on such contained cementitious column, said bearing surfaces being in engagement.

8. A submarine structure as defined in claim 7, in which said lower portions of said tubular column members provide open-ended earth-penetrating portions extending downwardly beneath said base structure to stabilize the lower end of said framework against lateral shifting preparatory to drilling of said shafts, said portions penetrating the earth during lowering of said framework and before said base structure engages the earth in said zone.

9. A submarine structure as defined in claim 7, in which each cementitious column extends only a short distance above the corresponding interengaging means to provide a zone of the tubular column member immediately above the top of such cementitious column which can be cut to release said framework from its anchoring cementitious columns preparatory to movement of said framework to another location.

10. A submarine structure as defined in claim 7, in which each of said interengaging means is adjacent a junction of said base structure and the lower portion of the corresponding tubular column member.

11. A submarine structure as defined in claim 7, in which each interengaging means includes a flange means on the interior of the corresponding tubular column member and embedded in the contained cementitious column.

12. A submarine structure as defined in claim 7, in which each tubular column member includes an attachment section adjacent and forming a part of said lower portion of said tubular column member, said attachment portion carrying at least one of said bearing surfaces of said interengaging means, each attachment section providing means for connecting thereto at least a portion of said diagonal bracing means whereby loads imposed by said diagonal bracing means are transmitted to said attachment section and directly to said cementitious material.

13. A submarine structure as defined in claim 12, in which each of said attachment sections comprises a collar secured to the corresponding tubular column member to form a section thereof, and in which said interengaging means includes a flange means in said collar providing that one of said bearing surfaces engaging the other bearing surface provided by the contained cementitious column.

14. A submarine structure as defined in claim 12, including means for connecting said base section to each of said attachment sections.

15. A method of placing a prefabricated submarine structure in a zone of the earth's surface beneath a body of water, said prefabricated submarine structure comprising a multi-sided framework with quadrilateral sides of a shape determined by the relative lengths of two diagonal bracing members crossing each other on each of said sides, said submarine structure being of sufficient height to extend from the earth's surface to a position adjacent the surface of said body of water, which method includes the steps of: temporarily adjusting the lengths of said diagonal bracing members to rigidify said framework and the respective sides thereof to provide a rigid framework of initial shape; transporting said framework in such initial shape to a location above said zone; lowering said framework in said body of water until a lower portion thereof rests on and is supported by the earth's surface in said zone, the central axis of said framework tipping from the vertical in conformance with the slope of the earth's surface in said zone and a degree of penetration thereof by the corner of the lower portion of the framework; and adjusting the relative lengths of said diagonal bracing members to bring said central axis into a vertical position.

16. A method as defined in claim 15, including the additional step of erecting a platform on the upper end of said framework after said central axis has been made substantially vertical.

17. A method of attaching to the earth and supporting the weight and loads imposed upon a prefabricated marine structure having tubular column members at its corners extending downwardly below a base member, which method includes the steps of: lowering said prefabricated marine structure through a body of water above a zone of the earth's surface until said downwardly-extending portions of said column members penetrate into the earth a sufficient distance to cause said base member to rest upon said surface to temporarily support said structure; drilling into the earth through each of said tubular column members to form earth-bounded shafts below each of said column members; filling each shaft after the drilling thereof with a cementitious material; and continuing such filling until said cementitious material fills at least a part of the tubular column aligned with the shaft being filled.

18. A method as defined in claim 17 including the step of lowering an annular foraminous reinforcing structure into each of said shafts through the aligned column member to occupy at least a part of said shaft and its aligned tubular column member, and then filling said shaft and said part of said aligned tubular column with said cementitious material.

19. A method as defined in claim 17 including the step of lowering a pipe through each tubular column member as drilling progresses to prevent caving of the shaft being drilled, introducing the cementitious material through said pipe to discharge from the lower end thereof, and raising said pipe as said cementitious material discharges therefrom to fill that portion of the shaft below said lower end of said pipe.

20. A marine structure supported by the earth beneath a body of water, said structure including: a multi-cornered and at least partially prefabricated skeletonic framework providing a plurality of tubular column members having lower ends inserted into the earth; a corresponding number of shafts drilled into the earth on the prolongations of said tubular column members, each shaft being filled with a cementitious material extending into the lower end of the aligned tubular column member; and interengaging means between said lower end of each tubular column member and its contained cementitious material for transmitting directly to the latter the loads imposed on the former.

21. A marine structure as defined in claim 20 including a base structure resting on the earth's surface beneath said body of water, and means for connecting said tubular column members thereto so that said base structure will support the weight of said framework during drilling of said shafts and placement of said cementitious material.

22. A marine structure detachably supported by the earth beneath a body of water, said structure including: a multi-cornered skeletonic framework providing a number of tubular column members having lower ends inserted into the earth; a corresponding number of shafts drilled into the earth on the prolongations of said tubular column members; a column of cementitious material filling each shaft and a lower zone of its corresponding tubular column member to leave a severance zone of said tubular column member immediately above said lower zone and near the submerged surface of the earth, said column of cementitious material stopping short of said severance zone to permit severance of said skeletonic framework from said cementitious columns merely by severing said tubular column members in their respective severance zones; and interengaging means between each tubular column member and its cementitious column and position in said lower zone of the tubular column member for transmitting loads from said tubular column members directly to said cementitious columns.

23. A marine structure as defined in claim 22 including a base structure resting on the earth's surface beneath said body of water, and means for connecting said base structure to said tubular column members to support the weight of said framework during drilling of said shafts and placement of said cementitious material.

24. A marine structure detachably supported by the earth beneath a body of water and adapted to be moved to and reused at another location, said structure including: a multi-cornered skeletonic framework providing a number of tubular column members having lower portions; a corresponding number of shafts drilled into the earth on the prolongations of said tubular column members and respectively below said lower portions thereof; and a column of cementitious material filling each shaft and only a lower zone of its corresponding tubular column member to leave a severance zone of said tubular column member immediately above the top of and not occupied by said cementitious column and near the submerged surface of the earth to permit severance of said structure from said cementitious columns merely by severing said tubular column members in their respective severance zones, such severance providing reusable lower ends on said tubular column members.

WILLIAM A. HUNSUCKER.

REFERENCES CITED

The following references are of record in the file of this patent:

UNITED STATES PATENTS

| Number | Name | Date |
|---|---|---|
| 604,235 | Jordan | May 17, 1898 |
| 1,529,113 | Burns | Mar. 10, 1925 |
| 1,635,730 | Tromanhauser | July 12, 1927 |
| 1,860,792 | Upson | May 31, 1932 |
| 1,867,030 | Roberts | July 12, 1932 |
| 2,210,408 | Henry | Aug. 6, 1940 |
| 2,236,682 | Gross | Apr. 1, 1941 |
| 2,398,351 | Baker | Apr. 16, 1946 |
| 2,422,168 | Kirby | June 10, 1947 |
| 2,429,952 | Willey | Oct. 28, 1947 |